Nov. 20, 1962 G. A. SYVERSON 3,064,998
LOCKABLE SWIVEL PIPE COUPLING
Original Filed Aug. 9, 1957
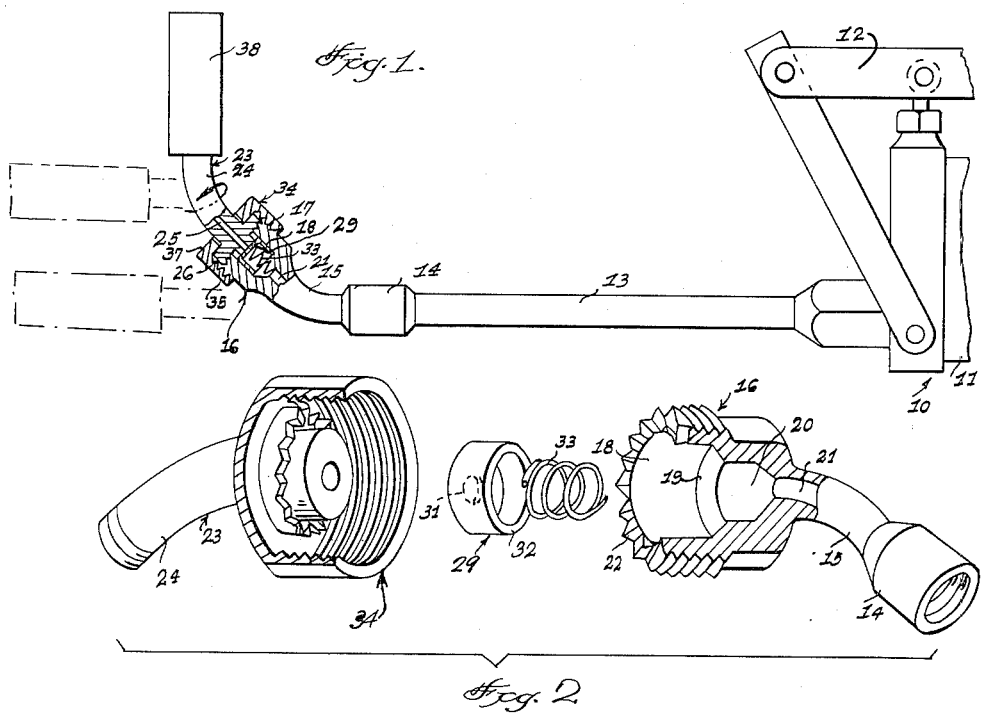
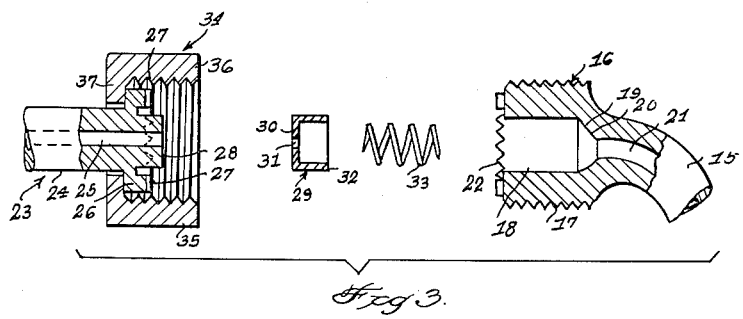
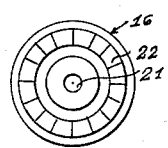
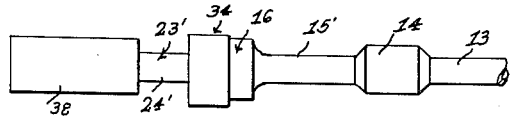
INVENTOR.
GEORGE A. SYVERSON
BY *Victor J. Evans & Co.*
ATTORNEYS 3,064,998
LOCKABLE SWIVEL PIPE COUPLING
George A. Syverson, Hennepin County, Minn.
(3927 W. Broadway, Robbinsdale, Minn.)
Continuation of application Ser. No. 677,340, Aug. 9, 1957. This application Oct. 31, 1960, Ser. No. 68,324
2 Claims. (Cl. 285—101)

This invention relates to a lockable swivel coupling, and more particularly to a swivel coupling for use with a grease gun.

The object of the invention is to provide a lockable swivel coupling which will facilitate the application of grease or lubricant to hard to reach locations.

Another object of the invention is to provide a swivel coupling wherein a fitting is adapted to be detachably connected to the end of a tube that leads from a grease gun so that when members or parts are being lubricated which are hard to reach, the present invention will facilitate the application of grease or lubricant to such hard to reach parts or locations.

A further object of the invention is to provide a swivel coupling which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is a fragmentary elevational view showing a portion of a grease gun, and illustrating the swivel coupling of the present invention connected thereto, and with parts broken away and in section.

FIGURE 2 is a fragmentary exploded view in perspective, showing the parts of the swivel coupling, and with parts broken away and in section.

FIGURE 3 is a side elevational view of the swivel coupling, with parts broken away and in section, and showing the parts disassembled.

FIGURE 4 is an end elevational view looking at the head and showing the teeth or serrations thereon.

FIGURE 5 is a fragmentary elevational view illustrating a modification.

Referring in detail to the drawings, the numeral 10 indicates a portion of a conventional grease gun, which includes the usual barrel 11, and handle 12, and extending from the gun 10 is a tube 13. A conduit 15 has an adaptor 14 connected to an end of the tube 13. The conduit 15 is provided with an enlarged head 16, FIGURE 2, and a portion of the head 16 is threaded externally as at 17. The interior of the head 16 is provided with a chamber 18 which terminates in a tapered or flaring portion or seat 19, and the tapered portion 19 terminates in a chamber 20 of reduced size. The chamber 20 communicates with a passage 21 in the conduit 15. The end of the head 16 is provided with a plurality of teeth or serrations 22.

The numeral 23 indicates a fitting which includes a tubular portion 24 that is provided with a longitudinally extending passageway 25 therein. Extending outwardly near an end of the tubular portion 24 and secured thereto or formed integral therewith, is an annular shoulder 26 which is provided with a plurality of teeth or serrations 27 of the same length as and which are adapted to intermesh or coact with the teeth 22 on the head 16. Shoulder 26 is spaced from the end of fitting 23 a distance greater than the length of teeth 22 and 27.

An end of the tubular portion 24 is shaped to define a face 28 preferably flat, and the numeral 29 designates a sealing member which may be made of leather or the like. The sealing member 29 includes an end wall 30 which is provided with a central opening 31, and the sealing member 29 further includes a cylindrical wall member 32. The numeral 33 indicates a coil spring which is provided for urging the wall 30 against the face 28 to provide a yielding seal.

There is further provided a locking collar which is indicated generally by the numeral 34, and the collar 34 includes a cylindrical wall section 35 which is threaded internally as at 36 for engaging the threaded portion 17 of the head 16. The collar 34 further includes an annular flange 37 which is adapted to engage the shoulder 26 on the fitting 23. Collar 34 provides for greater movement than the length of teeth 22 and 27 as seen in FIGURES 2 and 3. Spring 33 is of sufficient length to keep seal 31 under pressure against face 28 whenever collar 34 is engaged with head 16.

It will be seen that in the construction shown in FIGURES 1-4, the conduit 15 has a curved shape and the tubular portion 24 of the fitting 23 is also curved. However, in FIGURE 5 there is shown a modification wherein the numeral 15' indicates a conduit which is straight, and the numeral 24' designates a straight tubular portion of a fitting 23'.

The numeral 38 indicates a grease gun adaptor which is mounted on an end of the fitting 23.

From the foregoing, it is apparent that there has been provided a swivel coupling for use with a grease gun such as the grease gun 10 wherein the adaptor 38 can be arranged at different angular positions, as for example as shown by broken lines in FIGURE 1. In use, with the parts arranged as shown in FIGURE 1, it will be seen that by actuating the handle 12, grease from the gun 10 will be pumped out through the tube 13, and this grease will flow out through the passageway 21 in the conduit 15. This grease will then flow through the small aperture 31 in the sealing member 29 and the grease will pass out through the passageway 25 in the fitting 23 so that the grease can be discharged through the adaptor 38 onto the particular member being lubricated. The locking collar 34 includes the portion 36 which is arranged in threaded engagement with the portion 17 of the head 16 whereby the fitting 23 is maintained connected to the conduit 15. The coil spring 33 serves to urge or bias the sealing member 29 against the face 28 of the fitting 23 so that an effective seal is provided whether teeth 22 and 27 are in engagement or not. In view of the fact that the portion 24 is arranged at substantially 90 degrees with respect to the tube 13, it will be seen that the lubricant or oil or grease can be readily applied to areas or locations which are usually inaccessible. When it is desired to shift the position of the fitting 23, it is only necessary to unloosen the locking collar 34 on the head 16 whereby the teeth 27 can be moved out of engagement with the teeth 22 whereby the fitting 23 can be shifted to a different angular position, as for example it can be shifted to one of the positions shown in broken lines in FIGURE 1.

In FIGURE 5 there is shown a modification wherein instead of the conduit being curved, the conduit 15' is straight, and similarly the tubular portion 24' of the fitting 23 is straight instead of being curved as for example as shown in FIGURES 1, 2 and 3. However, the principle of the swivel is otherwise the same.

Thus, it will be seen that according to the present invention there has been provided a swivel which can be locked in place and the interengaging serrations 27 and 22 are firmly held in interengagement by means of the locking nut or collar 34. Also, the member 29 provides an effective grease seal within the swivel. The present invention is especially suitable for use in reaching out of the way grease fittings which are found on various types of equipment, and the swivel can be used on a grease gun as previously described. In FIGURE 1 there is shown a 90 degree offset swivel but the principle of the present invention can be used on swivels which have an offset from 5 degrees to 180 degrees, and the device can also be used as a position locked coupling for use on grease gun adaptor tubes. The number of serrations can be varied as desired, and the parts can be made of any suitable material and in different shapes or sizes. The leather cup 29 and spring 33 serve to provide a grease seal on the swivel. The serrations or teeth make it possible to lock the swivel in various positions, and the nut or collar 34 serves to hold the serrated edges in locked position. Also, various types or sizes of pipes can be used with the present invention. The parts may be bent or they may be straight and when the parts are bent, they may have any desired curvature or angular formation. The chambers in the head 16 define a seat for receiving an end of the spring 33, and the leather cup 29 is arranged over the spring 33 as shown in the drawings. When the parts are assembled, the leather cup 29 fits flush and smoothly against the face 29. The collar 34 serves to lock the serrated edges together in the meshed position, whether the straight or angled parts are used. The swivel locks itself into position by means of the serrated edges, and the principle of the present invention can be used for any desired purpose.

Heretofore when using grease guns where portability of the gun is essential, as for example when the grease gun must be carried to the piece of equipment to be greased, it has been usually necessary to use both hands on the gun and such a grease gun works all right as long as the fitting to be lubricated is exposed and as long as it could be readily reached by pushing the gun straight onto the fitting. However, when the fittings are in an out of the way position, lubrication thereof has been difficult. Heretofore, users have tried to overcome this difficulty by adding a piece of rubber hose, but if one person is operating the gun, the hose has to be dropped in order to operate the gun and sometimes the adaptor will break off the fitting before the grease gun can be used. In order to use a grease gun with a rubber hose, it is usually necessary that two men do the greasing since one must hold the adapter to the fitting while the other operates the gun.

With the position locked offset swivel of the present invention, the grease gun can be used by one person, and it can be locked in any desired position and this leaves both hands free to operate the gun. To make the gun more flexible, a swivel with an adaptor tube position locked coupler is added.

It is virtually impossible to reach out of the way places with a straight adaptor tube so that a swivel of some kind is usually essential on any type of grease gun. While attempts have been made to make such devices in the past, the previous devices have been made in such a way that the grease gun adaptor and the swivel are in one piece and when the adaptor is worn out, the complete swivel unit has to be replaced.

However, with the present invention, the offset swivel is made with the adaptor end of the swivel threaded with a standard pipe thread which is standard on all grease gun adaptors or couplers and there are many different types made and each operator has his own favorite type of adaptor.

There are also several types of ratchet type swivels and these may work good when new, but after they have been used they will not stay in any given position unless held in that position with one hand and since the operator has only two hands, it is practically impossible to use this type of swivel on grease guns.

The swivel of the present invention is simple to make and easily repaired and the device includes a novel and effective means for sealing out the grease on the swivel. This seal is accomplished by mean of the leather cup 29 which is held in position by means of the spring 33. Even though the cup 29 may wear out, it can be easily replaced and aside from the cup 29, the other parts are practically indestructible.

This application is a continuation of my pending application Serial No. 677,340, filed August 9, 1957 and now abandoned.

While I have shown a preferred form of my invention, I reserve all rights to such modifications as properly fall within the scope of the invention as claimed.

What is claimed is:

1. A combination lockable swivel comprising: a conduit terminating in a head, said head having an open ended chamber therein, a cup-shaped sealing member having a central opening positioned inside said chamber, a spring approximately as long as the depth of said chamber therein and engaging said cup-shaped sealing member and urging it toward the open end of said chamber, the walls of said cup-shaped sealing member engaging the walls of said chamber in sealing relationship, a fitting having an axially extending cylindrical conduit portion terminating in a seal engaging face, an annular shoulder formed on said fitting and spaced from said seal engaging face, the portion of said fitting extending beyond said annular shoulder being of a diameter to fit within said chamber, a plurality of cooperating, symmetrically spaced, axially extending teeth on said annular shoulder and the free end of said head, the portion of said fitting extending from said annular shoulder to said seal engaging face being longer than said teeth, a flanged collar longer than said teeth rotatably embracing the conduit portion of said fitting and retained axially thereon by said annular shoulder, and cooperating internal and external threads extending axially farther than said teeth are long on said collar and head respectively.

2. The combination lockable swivel of claim 1 in which at least one of said conduit and conduit portion of said fitting is curved.

References Cited in the file of this patent
UNITED STATES PATENTS

| | | |
|---|---|---|
| 672,498 | Drew | Apr. 23, 1901 |
| 2,040,177 | Johnson | May 12, 1936 |
| 2,190,344 | Selger | Feb. 22, 1938 |
| 2,529,685 | Ginter | Nov. 14, 1950 |
| 2,543,311 | Augspurger | Feb. 27, 1951 |
| 2,587,938 | Warren | Mar. 4, 1952 |